(12) United States Patent
Besanson et al.

(10) Patent No.: US 12,147,572 B2
(45) Date of Patent: Nov. 19, 2024

(54) CONTROLLING ACCESS TO DE-IDENTIFIED DATA SETS BASED ON A RISK OF RE-IDENTIFICATION

(71) Applicant: Accenture Global Solutions Limited, Dublin (IE)

(72) Inventors: Gaston Besanson, Barcelona (ES); Andrea Amorosi, Barcelona (ES); Runar Gunnerud, Oslo (NO); Bartomeu Pou Mulet, Barcelona (ES); Joel Gordillo Solana, Barcelona (ES); Frode Huse Gjendem, Barcelona (ES); Geir Prestegård, Jar (NO); Rubén Sánchez Fernández, Barcelona (ES)

(73) Assignee: Accenture Global Solutions Limited, Dublin (IE)

( * ) Notice: Subject to any disclaimer, the term of this patent is extended or adjusted under 35 U.S.C. 154(b) by 417 days.

(21) Appl. No.: 17/110,193

(22) Filed: Dec. 2, 2020

(65) Prior Publication Data

US 2021/0165913 A1    Jun. 3, 2021

(30) Foreign Application Priority Data

Dec. 3, 2019 (EP) ..................................... 19383071

(51) Int. Cl.
*G06F 21/62* (2013.01)
*G06N 3/126* (2023.01)
*G06N 7/01* (2023.01)

(52) U.S. Cl.
CPC ...... *G06F 21/6254* (2013.01); *G06F 21/6227* (2013.01); *G06N 3/126* (2013.01); *G06N 7/01* (2023.01)

(58) Field of Classification Search
CPC ... G06F 21/6254; G06F 21/6227; G06N 7/01; G06N 3/126
See application file for complete search history.

(56) References Cited

U.S. PATENT DOCUMENTS 11,238,960 B2 *   2/2022   Korte ..................... G16H 10/60
2010/0077006 A1   3/2010   El Emam et al.
(Continued)

FOREIGN PATENT DOCUMENTS

WO   WO-2019086553 A1 *   5/2019

OTHER PUBLICATIONS

Kathleen Benitez, Bradley Malin, Evaluating re-identification risks with respect to the HIPAA privacy rule, Journal of the American Medical Informatics Association, vol. 17, Issue 2, Mar. 2010, pp. 169-177, https://doi.org/10.1136/jamia.2009.000026 (Year: 2010).*

(Continued)

*Primary Examiner* — William S Powers
*Assistant Examiner* — Joshua N Gonzales
(74) *Attorney, Agent, or Firm* — Polsinelli PC

(57) ABSTRACT

A system may receive, from one or more data sources, one or more de-identified data sets that include de-identified personal data. The system may receive a request for a feature set of the one or more de-identified data sets, wherein the feature set includes a set of quasi-identifiers included in the de-identified personal data. The system may calculate a re-identification risk score for the set of quasi-identifiers. The system may selectively output, based on the re-identification risk score, one of: actual data, from the one or more de-identified data sets, of the feature set if the re-identification risk score satisfies a condition, or synthetic data, generated by the device from the one or more de-identified data sets, for the feature set, or a combination of the synthetic data and the actual data for the feature set, if the re-identification risk score does not satisfy the condition.

20 Claims, 8 Drawing Sheets

(56) References Cited

U.S. PATENT DOCUMENTS

| | | | |
|---|---|---|---|
| 2014/0189858 A1* | 7/2014 | Chen | G06F 21/6254 |
| | | | 726/22 |
| 2017/0177907 A1* | 6/2017 | Scaiano | G06N 7/01 |
| 2018/0089612 A1 | 3/2018 | Kalra et al. | |
| 2019/0138749 A1* | 5/2019 | Kim | G06F 21/6254 |
| 2019/0228183 A1* | 7/2019 | Choi | G06F 21/62 |
| 2020/0312457 A1* | 10/2020 | Kasthurirathne | G06N 20/20 |
| 2021/0049282 A1* | 2/2021 | Di Valentino | G06F 21/577 |
| 2022/0237323 A1* | 7/2022 | Miettinen | G06N 3/08 |

OTHER PUBLICATIONS

Extended European Search Report for Application No. EP19383071.8, mailed on Mar. 20, 2020, 8 pages.

* cited by examiner

CONTROLLING ACCESS TO DE-IDENTIFIED DATA SETS BASED ON A RISK OF RE-IDENTIFICATION

CROSS-REFERENCE TO RELATED APPLICATION

This application claims priority to European Patent Application No. 19383071.8 entitled "CONTROLLING ACCESS TO DE-IDENTIFIED DATA SETS BASED ON A RISK OF RE-IDENTIFICATION," filed on Dec. 3, 2019. The entire content of which is expressly incorporated herein by reference.

BACKGROUND

Re-identification is a process by which anonymized or de-identified personal data is matched with its true owner. In order to protect the privacy interests of consumers, personal identifiers, such as name and social security number, are often removed from databases containing sensitive information. This anonymized, or de-identified, data safeguards the privacy of consumers while still making useful information available to marketers or data mining companies. However, it has been determined that this anonymized data can be re-identified, such that sensitive personal data may be linked back to an individual.

SUMMARY

According to some implementations, a method may include receiving, by a device and from one or more data sources, one or more de-identified data sets that include de-identified personal data; receiving, by the device, a request for a feature set of the one or more de-identified data sets, wherein the feature set includes a set of quasi-identifiers included in the de-identified personal data; calculating, by the device, a re-identification risk score for the set of quasi-identifiers; and selectively outputting, by the device and based on the re-identification risk score, one of: actual data, from the one or more de-identified data sets, of the feature set if the re-identification risk score satisfies a condition, or synthetic data, generated by the device from the one or more de-identified data sets, for the feature set, or a combination of the synthetic data and the actual data for the feature set, if the re-identification risk score does not satisfy the condition.

According to some implementations, a device or system may include one or more memories; and one or more processors, communicatively coupled to the one or more memories, configured to: receive, from multiple data sources, multiple de-identified data sets that include de-identified personal data; receive a request for a feature set from the multiple de-identified data sets, wherein the feature set includes multiple sets of quasi-identifiers, wherein each set of quasi-identifiers is included in a different de-identified data set of the multiple de-identified data sets; calculate a re-identification risk score for the multiple sets of quasi-identifiers; and selectively output, based on the re-identification risk score, one of: actual data, from the multiple de-identified data sets, of the feature set if the re-identification risk score satisfies a condition, or synthetic data, generated by the device from the multiple de-identified data sets, for the feature set, or a combination of the synthetic data and the actual data for the feature set, if the re-identification risk score does not satisfy the condition.

According to some implementations, a non-transitory computer-readable medium storing may store one or more instructions that, when executed by one or more processors, cause the one or more processors to: receive, from multiple data sources, multiple de-identified data sets that include de-identified personal data; receive a request for a feature set from the multiple de-identified data sets, wherein the feature set includes multiple sets of quasi-identifiers, wherein each set of quasi-identifiers is included in a different de-identified data set of the multiple de-identified data sets; calculate a re-identification risk score for the multiple sets of quasi-identifiers; and selectively output, based on the re-identification risk score, one of: actual data, from the multiple de-identified data sets, of the feature set if the re-identification risk score satisfies a condition, or synthetic data, generated by the device from the multiple de-identified data sets, for the feature set, or a combination of the synthetic data and the actual data for the feature set, if the re-identification risk score does not satisfy the condition.

According to some implementations, an apparatus may include may include means for receiving, from one or more data sources, one or more de-identified data sets that include de-identified personal data; means for receiving a request for a feature set of the one or more de-identified data sets, wherein the feature set includes a set of quasi-identifiers included in the de-identified personal data; means for calculating a re-identification risk score for the set of quasi-identifiers; and means for selectively outputting, based on the re-identification risk score, one of: actual data, from the one or more de-identified data sets, of the feature set if the re-identification risk score satisfies a condition, or synthetic data, generated by the device from the one or more de-identified data sets, for the feature set, or a combination of the synthetic data and the actual data for the feature set, if the re-identification risk score does not satisfy the condition.

DETAILED DESCRIPTION

Figure 1A:
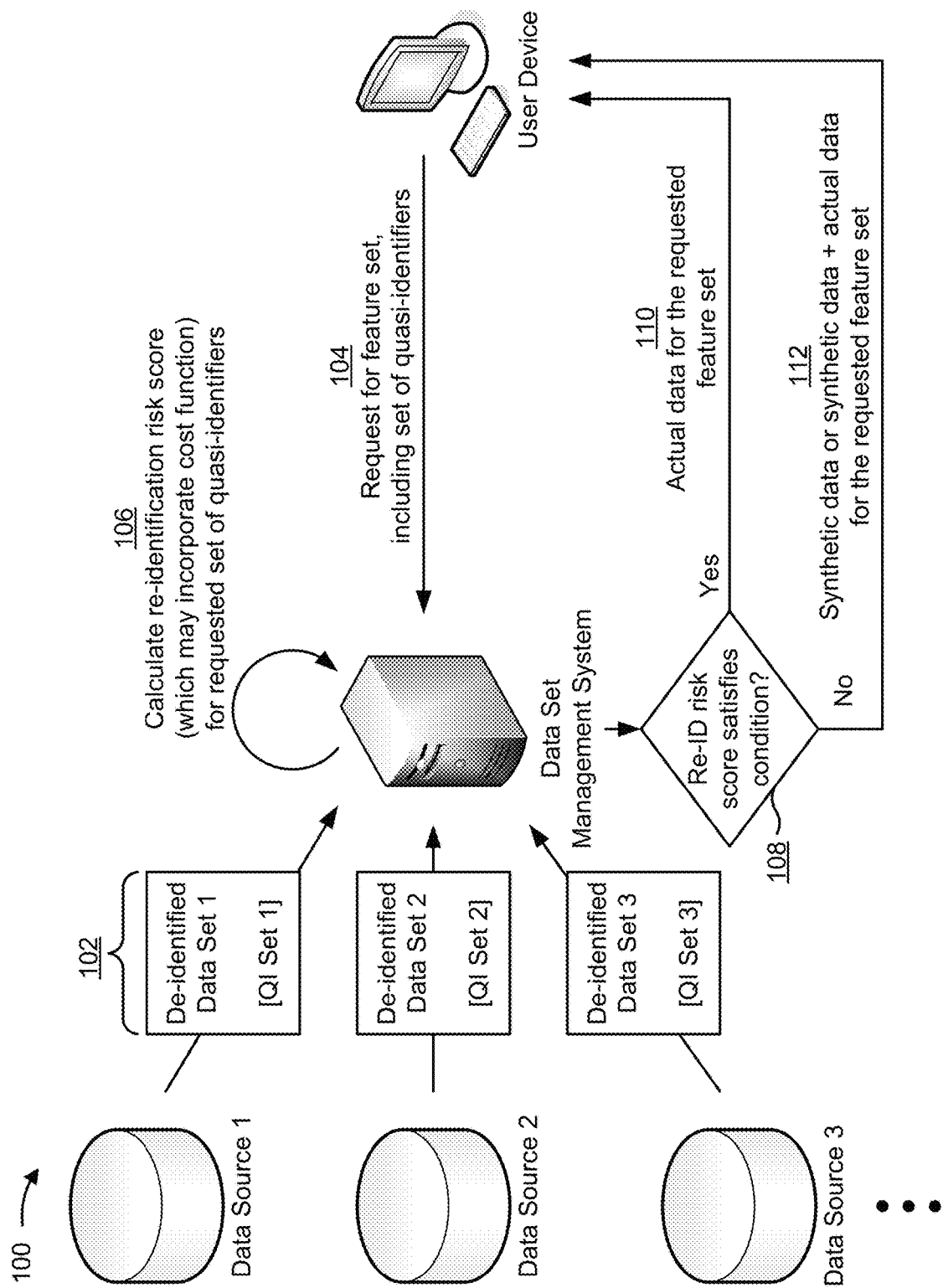
FIGS. 1A-1D are diagrams of one or more example implementations described herein.

The following detailed description of example implementations refers to the accompanying drawings. The same reference numbers in different drawings may identify the same or similar elements.

Re-identification of de-identified data that is stored by computing devices (e.g., computers, servers, data centers, cloud computing devices, and/or the like) presents serious security and privacy concerns. However, sharing of the de-identified data may enable research to be performed on such data to achieve scientific advancements. In some cases, a de-identified data set may contain a huge volume of data (e.g., hundreds, thousands, millions, or billions of entries or data points), and even larger data sets can be created by aggregating multiple data sets. Due to the volume of data, it is extremely difficult to determine a risk of the data being used for re-identification. Some techniques and apparatuses described herein permit a data set management system to control access to data based on a re-identification risk.

FIGS. 1A-1D are diagrams of an example implementation 100 described herein. As shown in FIGS. 1A-1D, example implementation 100 may include multiple data sources, a data set management system, a user device, and a source administrator device. The data set management system may provide a collaborative platform where users (e.g., researchers, data miners, marketers, and/or the like) can request data sets (or portions of data sets) from a variety of data sources. The data sets may contain de-identified (e.g., anonymized) personal data. The data set management system may determine or calculate a risk of re-identification of the personal data, and may restrict access to data and/or may generate and provide synthetic data for all or a portion of the de-identified personal data based on the risk of re-identification. Furthermore, the data set management system may control access to a variety of data sets using user credentials, which can be specific to different data sets and/or data sources. A user may use the data set management system to run computer-assisted analyses or simulations on the requested data.

As shown by reference number 102, the data set management system may receive one or more de-identified data sets from one or more data sources (e.g., via a push mechanism, a pull mechanism, or a trigger-based mechanism). A de-identified data set (sometimes referred to as an anonymized data set) may refer to a data set that includes personal data from which personally identifiable information (PII) has been removed. Examples of PII include a full name, a government-issued personal identifier (e.g., a Social Security number, a driver's license number, a passport number, and/or the like), an institution-issued personal identifier (e.g., a bank account number, an investment account identifier, and/or the like), an email address, a residential address or home address, a telephone number, a medical record number, a health plan beneficiary number, a biometric identifier or marker (e.g., a finger print, a voice print, a photograph or image, a facial image, or genetic data, among other examples), or other data that can be used to personally identify an individual.

Example de-identified data sets include a de-identified electronic medical record (EMR), de-identified patient or healthcare data, de-identified user data for a service (e.g., a retail service, a subscription service, or a service that uses user preferences to make recommendations, among other examples), de-identified social media data, de-identified purchase histories, de-identified web browsing histories, de-identified employment data, de-identified census data, de-identified demographic or socio-economic data, de-identified political data (e.g., from political surveys), and/or the like. In some cases, a de-identified data set may include sensitive data that may not necessarily be used to identify an individual, but that includes sensitive information about an individual, such as health information, prescription information, salary information, purchase information, voting information, user preferences, and/or the like.

In example implementation 100, the data set management system is shown as receiving a first de-identified data set (shown as De-Identified Data Set 1) from a first data source (shown as Data Source 1), receiving a second de-identified data set (shown as De-Identified Data Set 2) from a second data source (shown as Data Source 2), and receiving a third de-identified data set (shown as De-Identified Data Set 3) from a third data source (shown as Data Source 3). However, in practice, the data set management system may receive a different number of data sets (e.g., tens, hundreds, thousands, or millions of data sets) from a different number of data sources (e.g., tens, hundreds, thousands, or millions of data sources). Additionally, or alternatively, the data set management system may receive multiple data sets from a particular data source. A data source of a data set may refer to a system or entity (e.g., an organization or an individual) that gathered or obtained the data in the data set, that purchased rights to the data in the data set, that controls access to the data in the data set, and/or the like.

As shown, a de-identified data set may include a set of quasi-identifiers (shown as a QI set). For example, the first de-identified data set may include a first set of quasi-identifiers (shown as QI Set 1), the second de-identified data set may include a second set of quasi-identifiers (shown as QI Set 2), and the third de-identified data set may include a third set of quasi-identifiers (shown as QI Set 3). A quasi-identifier may refer to data that is not itself personally-identifiable information, but that can be combined with one or more other quasi-identifiers to personally identify an individual. Thus, multiple quasi-identifiers can be combined via re-identification to create personally-identifiable information. Examples of quasi-identifiers include gender, age, race, ethnicity, country of birth, citizenship, aboriginal identity, language spoken, profession, height, weight, partial name (e.g., first name, middle name, or last name), birth date, location information (e.g., postal code, partial address information, a geographic region of residency, and/or the like), event dates (e.g., death date, admission date, discharge date, date of a procedure, date of a visit, or specimen collection date, among other examples), and/or the like.

As shown by reference number 104, a user of a user device may interact with the user device to request a feature set from the data set management system. A feature set may refer to the data requested by the user or user device, and may include an entire data set, multiple data sets, a portion of a data set (e.g., one or more rows of data in a table of the data set, one or more columns of data in the table, a set of attributes included in the data set, a set of variables included in the data set, and/or the like), portions of multiple data sets, or some combination thereof. In some implementations, the requested feature set may include a set of quasi-identifiers. For example, a researcher may request data about gender, age, race, and date of onset of a disease or health condition. In some implementations, the requested feature set may include a set of variables, and some or all of those variables may be quasi-identifiers.

In some implementations, the data set management system may control access, by a user, to one or more data sets. For example, the data set management system may issue a credential (e.g., a username, a password, a token, and/or the like) for the user and/or the user device, and the credential may be used to grant or deny access to different data sources and/or different data sets. In some implementations, a credential may be specific to a data source. Additionally, or alternatively, the credential may be specific to a data set. An administrator associated with the data source may provide input to the data set management system to grant or deny access to data sets associated with the data source.

As shown by reference number 106, the data set management system may calculate a re-identification risk score for the set of quasi-identifiers. The re-identification risk score may represent a risk (e.g., a probability, a likelihood, etc.) that the requested set of quasi-identifiers can be used to re-identify an individual (e.g., can be combined to become personally-identifiable information). The data set management system may determine an action to be performed with respect to the request for the feature set based on the re-identification risk score, such as whether to provide actual data, whether to provide synthetic data, whether to provide a combination of actual data and synthetic data, a recommendation to provide, whether to perform the same action or different actions for data from different data sets, and/or the like. Additional details regarding calculating the re-identification risk score are described below in connection with FIGS. 1B and 1C. As shown, in some implementations, the data set management system may account for and/or incorporate a cost function when calculating the re-identification risk score, as described in more detail below in connection with FIG. 1C.

As shown by reference number 108, the data set management system may selectively output, to the user device, the requested data based on a determination of whether the re-identification risk score satisfies a condition. For example, as shown by reference number 110, if the re-identification risk score satisfies the condition (e.g., is less than or equal to a threshold, indicating a lower re-identification risk), then the data set management system may output, to the user device, actual data included in one or more de-identified data sets (e.g., data that was received from the one or more data sources). The actual data may include values, for the requested set of quasi-identifiers, that are included in one or more original de-identified data sets, as received from the one or more data sources.

As another example, as shown by reference number 112, if the re-identification risk score does not satisfy a condition (e.g., is greater than or equal to a threshold, indicating a higher re-identification risk), then the data set management system may output, to the user device, synthetic data or a combination of synthetic data and actual data. The synthetic data may not be included in the one or more de-identified data sets (e.g., may not be received from the one or more data sources), but may be generated based on actual data included in the one or more de-identified data sets. The synthetic data may include values, for one or more requested quasi-identifiers, that are generated by the data set management system based on actual data included in one or more original de-identified data sets, as received from the one or more data sources.

For example, the data set management system may generate the synthetic data based on binary quasi-identifiers and/or count quasi-identifiers. A binary quasi-identifier may refer to a quasi-identifier that is capable of being one of two values (e.g., yes or no, male or female, and/or the like). A count quasi-identifier may refer to a quasi-identifier that has a numeric value (e.g., an integer value), such as an age, a year, and/or the like. In some implementations, the data set management system may use a generative adversarial network (GAN) algorithm with an autoencoder architecture to generate high-dimensional discrete samples for the synthetic data. In some implementations, minibatch averaging may be used to avoid mode collapse.

In some implementations, the data set management system may train a machine learning model on actual data, and/or may use a trained machine learning model to generate the synthetic data (e.g., from actual data). For example, the synthetic data may be generated based on a machine learning model that is trained to identify both binary quasi-identifiers and count quasi-identifiers included in the set of quasi-identifiers. In some implementations, the trained machine learning model may generate synthetic data with the same or similar statistical values as the actual data. To enable generation of binary quasi-identifiers and count quasi-identifiers, the machine learning model may be designed to support different activation functions for different quasi identifiers. For example, a sigmoid activation function may be applied to binary quasi-identifiers to guarantee a binary outcome in the synthetic data. As another example, a rectified linear unit (ReLU) activation function may be applied to count quasi-identifiers to guarantee a non-negative outcome (e.g., a count outcome) in the synthetic data. Additionally, or alternatively, a loss function may be applied in generator and/or discriminator agents of the machine learning model to improve overall performance. For example, a binary cross-entropy loss function may be applied to binary data and/or a mean square error (MSE) loss function may be applied to count data. In this way, more realistic and useful synthetic data may be generated.

In some implementations, the condition for the re-identification risk score is whether the re-identification risk score satisfies a threshold (e.g., a numeric threshold, a threshold level, and/or the like). In some implementations, different thresholds and/or conditions may be used for different data sets and/or different data sources. For example, an administrator associated with a data set or a data source may interact with a source administrator device (e.g., a computer, a server, and/or the like) to provide input, to the data set management system, that indicates a threshold and/or a condition to be used for a particular data set and/or a group of data sets associated with a data source. Additionally, or alternatively, the data set management system may determine a threshold and/or a condition for a data set based on the amount and/or type of sensitive data or personal data included in a data set.

In some implementations, based on determining that the re-identification risk score does not satisfy the condition (e.g., indicating a high or unacceptable re-identification risk), the data set management system may identify a first subset of quasi-identifiers of the set of quasi-identifiers, and may generate synthetic data for the first subset of quasi-identifiers. The data set management system may replace the actual date for the first subset of quasi-identifiers with the synthetic data, and may recalculate the re-identification risk score for the set of quasi-identifiers based on the synthetic data generated for the first subset of quasi-identifiers and actual data for a second subset of quasi-identifiers of the set of quasi-identifiers.

If the data set management system determines that the recalculated re-identification risk score satisfies the condition (e.g., indicating a low or acceptable re-identification risk), then the data set management system may output the synthetic data generated for the first subset of quasi-identifiers and the actual data for the second subset of quasi-identifiers. If the data set management system determines that the recalculated re-identification risk score does not satisfy the condition, then the data set management system may generate additional synthetic data for the set of quasi-identifiers. For example, the data set management system may increase a number of quasi-identifiers included in the first subset of quasi-identifiers for which synthetic data is generated, and may decrease a number of quasi-identifiers included in the second subset of quasi-identifiers for which actual data is output. The data set management system may continue in this manner until the re-identification risk score satisfies the condition, and then may output the first subset of quasi identifiers (e.g., containing synthetic data) and the second subset of quasi identifiers (e.g., containing actual data) to the user device.

In some implementations, the data set management system may identify the first subset of quasi-identifiers for which synthetic data is to be generated by identifying a subset of quasi-identifiers, in the set of quasi-identifiers, that has a greater contribution to the re-identification risk score not satisfying the condition as compared to another subset of quasi-identifiers in the set of quasi-identifiers. The data set management system may use the subset of quasi-identifiers having the greater contribution (e.g., the greatest contribution) as the first subset of quasi-identifiers for which the synthetic data is to be generated. In this way, the data set management system may reduce an amount of processing that needs to be done to generate synthetic data.

In some implementations, the data set management system may employ a machine learning algorithm, such as a genetic algorithm, to identify the subset of quasi-identifiers that has a greater contribution (e.g., a greatest contribution) to the re-identification risk score not satisfying the condition. For example, the genetic algorithm may use quasi-identifiers as the type of variables, may use a set of quasi-identifiers as a population, may introduce mutation and/or crossover via the introduction of other quasi-identifiers, may use a fitness function of maximizing the re-identification probability from a set of quasi-identifiers in the population, may reduce the diversity in the population by selecting at each stage of the algorithm the individuals with higher fitness (e.g., a set of quasi-identifiers resulting in a higher re-identification probability), and may use a convergence criteria, such as a maximum number of generations, a threshold number of generations without any improvement in the best fitness value, or when a population statistic achieves a pre-defined bound, such as when all sets of quasi-identifiers have been used.

In some implementations, the data set management system may provide the user, via the user device, with access to computational resources (e.g., cloud computing resources) for analyzing the data (actual data and/or synthetic data). For example, the user may provide input to request certain computational resources or to request computational resources with certain characteristics or capabilities. The data set management system may allocate computational resources to the user or the user device accordingly. In some implementations, the data set management system may control whether the user is allowed to share analysis results, generated by the user, with other users, or download analysis results from the computational resources. In some implementations, a source device administrator may provide input to indicate whether analysis results generated using a data set (or group of data sets) is permitted to be shared with other users, and the data set management system may permit or deny sharing accordingly. In some implementations, the analysis results may be stored in the data set management system for future retrieval and/or reuse by the user.

In this way, the data set management system may determine a re-identification risk in near-real time based on a request from a user device, a data set from which de-identified data is provided, and potentially from a combination of data sets that may or may not be capable of being merged. The data set management system may be capable of modelling external knowledge without any explicit data. For example, the data set management system may receive probabilities of disclosure as inputs and does not need to explicitly re-identify a user to determine a risk score, thereby increasing security and privacy. Furthermore, the data set management system can determine a re-identification risk score for individual data sets belonging to different data custodians, and can also determine a re-identification risk score (e.g., an upper threshold) of risk when multiple data sets are merged together.

Figure 1B:
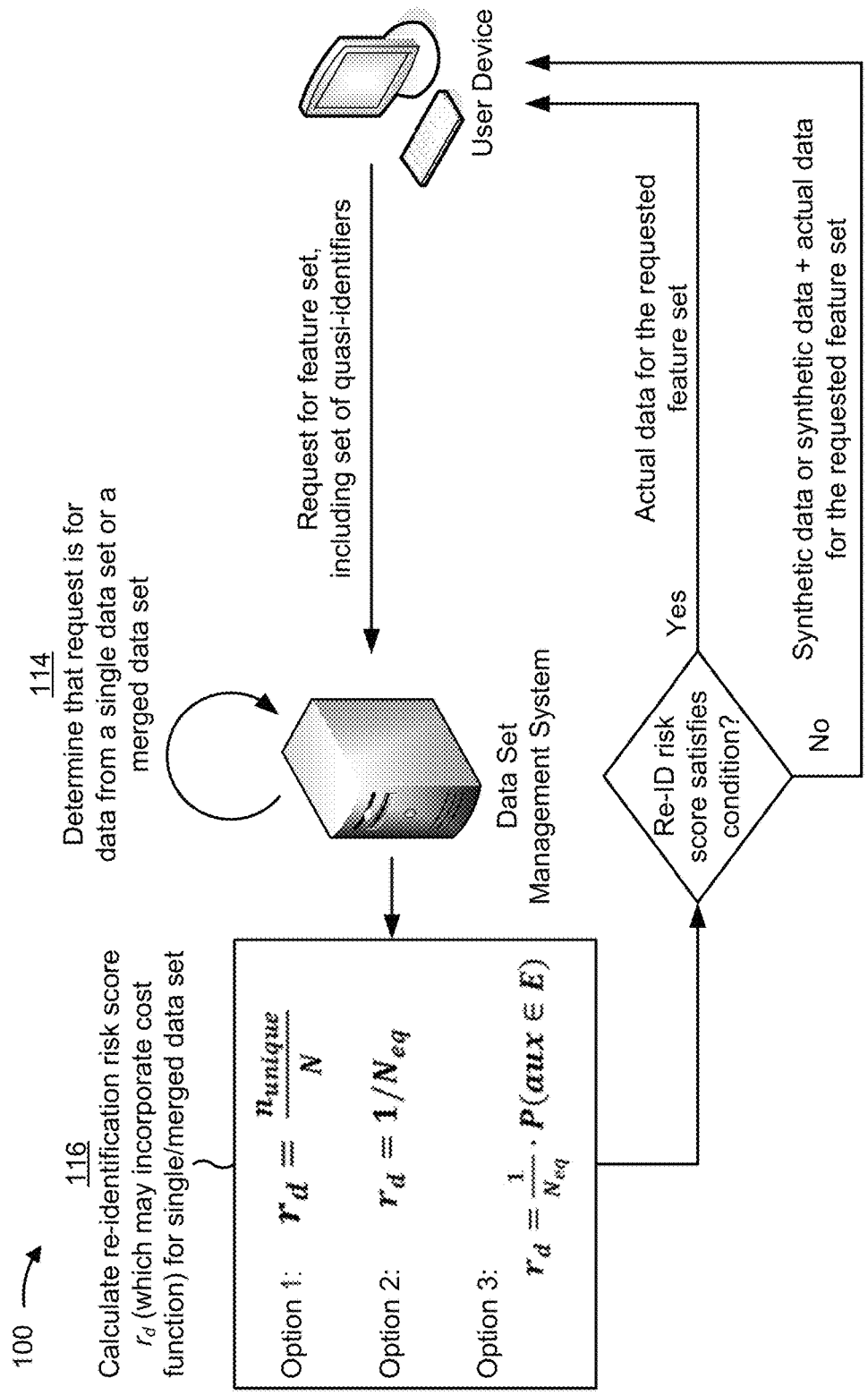

FIG. 1B shows examples of how the data set management system may calculate the re-identification risk score. In some implementations, the examples of FIG. 1B may apply when the data set management system calculates the re-identification risk score based on data from a single data set or from multiple data sets that are merged by the data set management system into a single data set prior to calculating the re-identification risk score.

For example, as shown by reference number 114, the data set management system may determine that the request for the feature set (from the user device) is a request for data from a single data set (e.g., a single table) or from multiple data sets that the data set management system is capable of merging (e.g., into a single data set or a single table). For example, the data set management system may determine that multiple data sets can be merged based on those data sets having matching or similar data formats, having a same number and/or arrangement of columns, having a same set of labels used for the set of quasi-identifiers, and/or the like. As shown by reference number 116, based on this determination, the data set management system may calculate a re-identification risk score (shown as $r_d$) for the single data set or the merged data set. In some implementations, the data set management system may determine a technique to be used to calculate the re-identification risk score (e.g., a first technique, a second technique, or a third technique described below, among other examples) based on, for example, a volume of data in a data set (e.g., a number of records, a number of entries, a number of quasi-identifiers, and/or the like), a computational complexity associated with the data set, an amount of computational resources available for calculation, and/or the like. In some implementations, the data set management system may account for and/or incorporate a cost function when calculating the re-identification risk score, as described in more detail below in connection with FIG. 1C.

In some implementations, the data set management system may calculate the re-identification risk score for the set of quasi-identifiers using a first technique (shown as Option 1). Using the first technique, the data set management system may calculate the re-identification risk score based on a number of records, in one or more de-identified data sets from which data is being requested, that belong to an equivalence class having a size of one (shown as $n_{unique}$), and a total number of records included in the one or more de-identified data sets (shown as N).

A record may refer to a set of related data, such as a row or entry in a table of the data set. An example record is a person of a certain age and gender has a certain disease or health condition. In some cases, a record in a data set may correspond to an individual, but the individual may be de-identified in the data set by removing PII from the record.

An equivalence class for a set of quasi-identifier may refer to the set of records that have the same values for the set of quasi-identifiers. Thus, all of the records that have the same values for a given set of quasi-identifiers (e.g., the requested set of quasi-identifiers) are part of the same equivalence class for that set of quasi-identifiers. A size of an equivalence class may refer to a number of records included in the equivalence class. An example equivalence class is a set of records, in one or more data sets, for females (e.g., using a first quasi-identifier of gender) between the ages of 20 and 30 (e.g., using a second quasi-identifier of age or age range).

As an example, the data set management system may calculate the re-identification risk score using the first technique as follows. Given an anonymized data set D containing N electronic health records that include no duplicate records and that includes quasi-identifiers aux and sensitive information, a vulnerable record r is that one that can be identified uniquely under a set of quasi-identifiers aux. In this case, the re-identification score for a record (sometimes referred to as a probabilistic risk of disclosure a record) $r_d$ may be calculated by:

$$r_d = P(r \in D | N_{eq}=1) \cdot P(aux \in E)$$

In the above expression, $P(r \in D | N_{eq}=1)$ is the probability of a record belonging to a equivalence class of size 1 (e.g., containing a single record) and $P(aux \in E)$ is the probability of a record to be uniquely identified in external sources (e.g., other than the one or more data sets received and/or stored by the data set management system). In the context of health or medical records, certain quasi-identifiers may be uncommon in the total population (e.g., event dates, as described above). As a result, an individual that is identified as unique in D could be also uniquely identified in external sources E. This implies that:

$$P(aux \in E) = 1$$

Thus, in some implementations, the data set management system may calculate the re-identification risk score using the first technique as follows:

$$r_d = P(r \in D | N_{eq}=1) = \frac{n_{unique}}{N}$$

In the above expression, $r_d$ is the re-identification risk score (sometimes referred to as a risk of disclosure), $n_{unique}$ is the number of records in D that belong to an equivalence class of size one, and N is the total number of records in D.

Additionally, or alternatively, the data set management system may calculate the re-identification risk score for the set of quasi-identifiers using a second technique (shown as Option 2). Using the second technique, the data set management system may calculate the re-identification risk score based on a size of an equivalence class for the set of quasi-identifiers (shown as $N_{eq}$).

As an example, the data set management system may calculate the re-identification risk score using the second technique as follows. Given an anonymized data set D containing N electronic health records that include no duplicate records and that includes quasi-identifiers aux and sensitive information, the re-identification score for a record $r_d$ may be calculated by:

$$r_d = P(aux \in E) \cdot P(r | aux)$$

In the above expression, $P(aux \in E)$ is the probability of finding the quasi-identifiers disclosed in an external source, and $P(r|aux)$ is the probability of matching an identity to r given some aux information known by an attacker and may account for a random match. It may be assumed that the attacker is omniscient, meaning that all external sources are available to the attacker and so are all of the quasi-identifiers. It may also be assumed that the attacker knows that the target is contained in D. This implies that:

$$P(aux \in E) = 1$$

Also, because there are not any duplicates in D and a given record can only have a set of quasi-identifiers aux, then $P(aux|r)=1$. Thus:

$$P(r | aux) = \frac{P(aux|r) \cdot P(r)}{P(aux)} = \frac{1 \cdot 1/N}{N_{eq}/N} = \frac{1}{N_{eq}}$$

In the above expression, $N_{eq}$ is the number of records that belong to an equivalence class. Thus, in some implementations, the data set management system may calculate the re-identification risk score using the second technique as follows:

$$r_d = \frac{1}{N_{eq}}$$

Additionally, or alternatively, the data set management system may calculate the re-identification risk score for the set of quasi-identifiers using a third technique (shown as Option 3). Using the third technique, the data set management system may calculate the re-identification risk score based on a size of an equivalence class for the set of quasi-identifiers (shown as $N_{eq}$) and a set of re-identification probabilities corresponding to the set of quasi-identifiers (shown as $P(aux \in E)$).

As an example, the data set management system may calculate the re-identification risk score using the third technique as follows. Given an anonymized data set D containing N electronic health records that include no duplicate records and that includes quasi-identifiers aux and sensitive information, the re-identification score for a record $r_d$ may be calculated by:

$$r_d = P(aux \in E) \cdot P(r | aux)$$

In the above expression, $P(aux \in E)$ is the probability of finding the quasi-identifiers disclosed in an external source, and $P(r|aux)$ is the probability of matching an identity to r given some aux information known by an attacker and may account for a random match. It may be assumed that the attacker is a general attacker with probabilistic knowledge from external data sources, meaning that all external sources are available and that each quasi-identifier has a probability of being discovered among external sources. This implies that:

$$P(aux \in E) = P(aux_1) \cdot P(aux_2) \cdot P(aux_N)$$

Where $P(aux_1)$ is the probability of disclosure of a first quasi-identifier (e.g., quasi-identifier 1) in the set of quasi-identifiers, $P(aux_2)$ is the probability of disclosure of a second quasi-identifier (e.g., quasi-identifier 2) in the set of quasi-identifiers, $P(aux_N)$ is the probability of disclosure of an $N^{th}$ quasi-identifier (e.g., quasi-identifier N) in the set of quasi-identifiers, and so on. Also, because there are not any duplicates in D and a given record can only have a set of quasi-identifiers aux, then $P(aux|r)=1$. Thus:

$$P(r | aux) = \frac{P(aux|r) \cdot P(r)}{P(aux)} = \frac{1 \cdot 1/N}{N_{eq}/N} = \frac{1}{N_{eq}}$$

In the above expression, $N_{eq}$ is the number of records that belong to an equivalence class. Thus, in some implementations, the data set management system may calculate the re-identification risk score using the third technique as follows:

$$r_d = \frac{1}{N_{eq}} \cdot P(aux \in E)$$

In some implementations, a re-identification probability for a quasi-identifier or a set of quasi-identifiers (e.g., $P(aux \in E)$) may be provided as input to the data set management system. Additionally, or alternatively, the data set management system may determine or derive a re-identification probability for a quasi-identifier based on searching a database of scientific literature, based on a level of generalization or specificity of the quasi-identifier (e.g., an exact date versus a month and year versus a year), based on a level of commonality or rarity for the quasi-identifier (e.g., a common or rare disease, laboratory test result, or drug prescription, among other examples), and/or the like. In some implementations, the data set management system may determine or derive a re-identification probability for a set of quasi-identifiers by performing a calculation on the individual probabilities for quasi-identifiers included in the set, such as by determining a maximum probability among the quasi-identifiers, a minimum probability among the quasi-identifiers, an average (e.g., mean or median) probability among the quasi-identifiers, a weighted average probability among the quasi-identifiers, and/or the like.

In some cases, from a set of quasi-identifiers aux, not all of the quasi-identifiers are needed to obtain exactly the same equivalence class. In this case, $\overline{aux}$ may represent a reduced set of quasi-identifiers that leads to the same equivalence class as the original quasi-identifiers. Thus, in some implementations, the data set management system may calculate the re-identification risk score using the third technique as follows:

$$r_d = \frac{1}{N_{eq}} \cdot P(\overline{aux} \in E)$$

Using this reduced set of quasi-identifiers $\overline{aux}$ that keep the equivalence class invariant, there exists a smaller set of quasi-identifiers $aux_{abs} \in \overline{aux}$ that maximize the risk by the trade-off of uniqueness and probability of disclosure. Thus, in some implementations, the data set management system may calculate the re-identification risk score using the third technique as follows:

$$r_d = \frac{1}{N_{eq,abs}} \cdot P(aux_{abs} \in E)$$

Where $N_{eq,abs}$ is the number of records of the equivalence class defined by the set of quasi-identifiers and $P(aux_{abs} \in E)$ is the probability of finding the subset of quasi-identifiers $aux_{abs}$ disclosed in an external source E. In some implementations, the data set management system may identify the subset of quasi-identifiers $aux_{abs}$ to reduce computational complexity, conserve processing resources, and/or reduce the amount of delay for providing output to the user device.

As further shown in FIG. 1B, after calculating the re-identification risk score, the data set management system may selectively output, to the user device, the requested data based on a determination of whether the re-identification risk score satisfies a condition, as described above in connection with FIG. 1A.

Figure 1C:
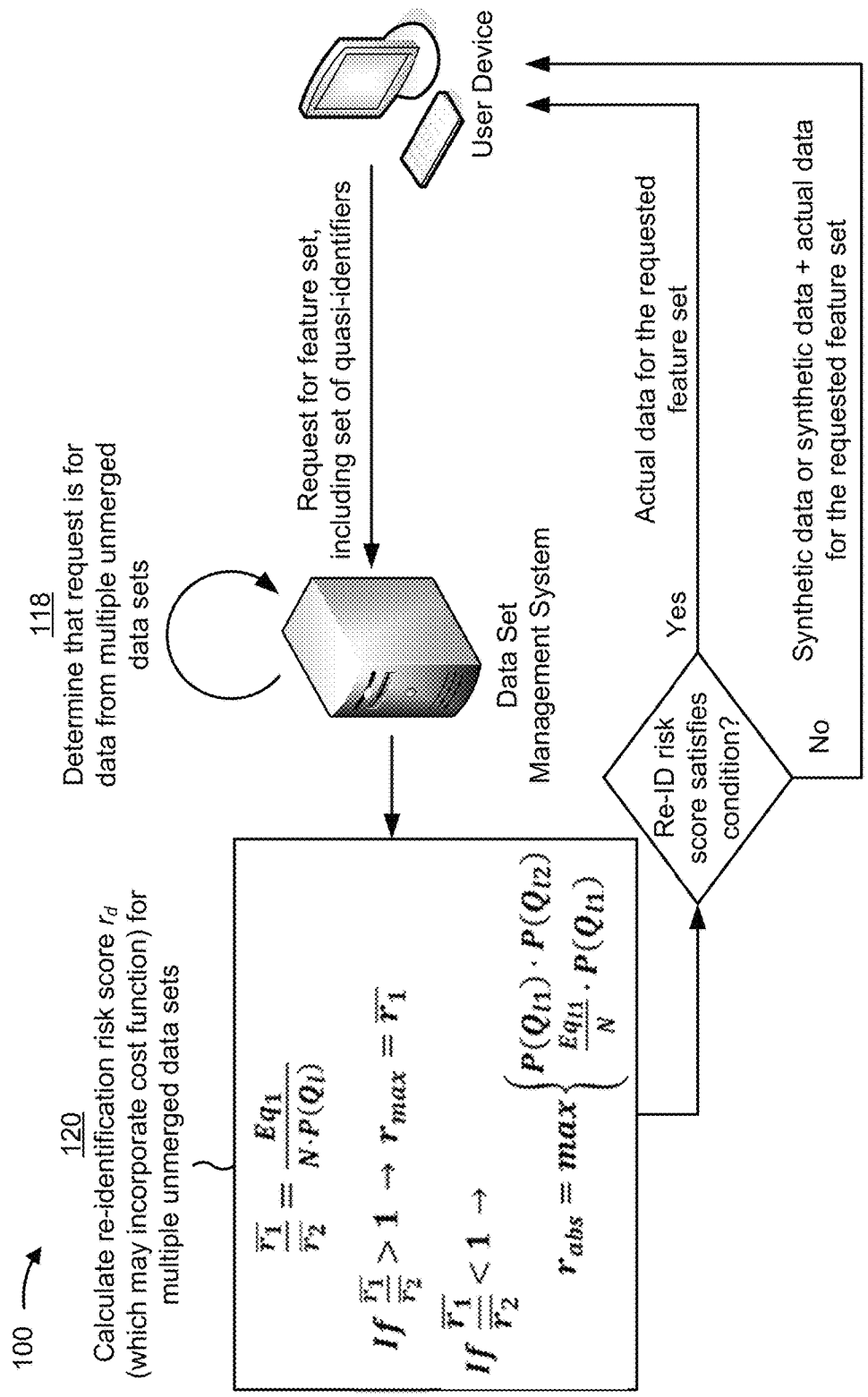

FIG. 1C shows examples of how the data set management system may calculate the re-identification risk score. In some implementations, the examples of FIG. 1C may apply when the data set management system calculates the re-identification risk score based on data from multiple data sets that are not merged by the data set management system into a single data set prior to calculating the re-identification risk score.

For example, as shown by reference number 118, the data set management system may determine that the request for the feature set (from the user device) is a request for data from multiple data sets (e.g., multiple tables), either from a single source device or multiple source devices. Furthermore, the data set management system may not merge the multiple data sets and/or may determine that the data set management system is not capable of merging the multiple data sets (e.g., into a single data set or a single table). For example, the data set management system may determine that the multiple data sets cannot be merged based on at least two of those data sets having different data formats, having a different number and/or arrangement of columns, having different labels used for the set of quasi-identifiers, and/or the like. As shown by reference number 120, based on this determination, the data set management system may calculate a re-identification risk score (shown as $r_d$) for the multiple unmerged data sets.

For example, given a set of tables or data sets ($D_1$, $D_2$, . . . , $D_N$) that cannot be merged into one table or one data set prior to calculating the re-identification risk score, an example data set may contain M quasi-identifiers ($Q_1$, $Q_2$, . . . , $Q_M$). In some implementations, different data sets may include different numbers of quasi-identifiers. Each quasi-identifier has a probability P of being disclosed (e.g., in an external source). A data set with M quasi-identifiers has $t=2^M$ possible combinations of quasi-identifiers ($aux_1$, $aux_2$, . . . , $aux_t$). In this case, a user request A may be represented by:

$$A = \bigcup_{j=1}^{N} aux_{i,j} = (aux_{i,1} \cup aux_{i,2} \cup \ldots \cup aux_{i,j} \cup \ldots \cup aux_{i,N})$$

In the above expression, $aux_{i,j}$ is the i-th arbitrary combination of quasi-identifiers from the j-th data set. Given this request A, the risk r can be defined independently for each component aux. The average risk $\bar{r}$ can be defined as follows:

$$\bar{r} = \frac{1}{N} \sum_{i=0}^{N} r_i = \frac{1}{N} \sum_{i=0}^{N} \frac{1}{N_{eq,i}} \cdot p(aux_i) =$$

$$= p(aux) \sum_{i=0}^{N} \frac{1/N_{eq,i}}{N} = \frac{Eq}{N} \cdot p(aux)$$

Because the risk depends on both the number of equivalence classes and the probability of disclosure of the quasi-identifiers, adding a new variable may increase or decrease the total risk. For example, let $r_1$ be the risk of a certain set of quasi-identifiers $aux_1$, and let $r_2$ be the risk of adding a new variable (e.g., a new quasi-identifier) to $aux_1$. In this case:

$$r_1 = \frac{Eq_1}{N} \cdot p(aux_1)$$

-continued $$r_2 = \frac{Eq_2}{N} \cdot p(aux_1) \cdot p(aux_2)$$

In the above expression, $aux_1$ is the set of quasi-identifiers 1, $aux_2$ is the set of quasi-identifiers being added, $Eq_1$ is the number of equivalence classes defined by $aux_1$, and $Eq_2$ is the number of equivalence classes defined by $aux_2$.

Then $\bar{r}_1$ and $\bar{r}_2$ can be compared to determine if the risk increases or not when additional quasi-identifiers are added:

$$\frac{\bar{r}_1}{\bar{r}_2} = \frac{\frac{Eq_1}{N} \cdot p(aux_1)}{\frac{Eq_2}{N} \cdot p(aux_1) \cdot p(aux_2)} =$$

In the above expression, Eq is the number of equivalence classes, and so $Eq_1$ is the number of equivalence classes for a first set of quasi-identifiers of the requested set of quasi-identifiers, and $Eq_2$ is the number of equivalence classes for a second set of quasi-identifiers of the requested set of quasi-identifiers. This expression can be rewritten as:

$$\frac{\bar{r}_1}{\bar{r}_2} = \frac{Eq_1}{Eq_2 \cdot p(aux_2)}$$

In some implementations, $$\frac{\bar{r}_1}{\bar{r}_2}$$

may be referred to as a differential risk score. Thus, in some implementations, the data set management system may determine the differential risk score based on a number of equivalence classes for a first set of quasi-identifiers of the requested set of quasi-identifiers ($Eq_1$), a number of equivalence classes for a second set of quasi-identifiers of the requested set of quasi-identifiers ($Eq_2$) (e.g., that are added to the first set of quasi-identifiers), and a re-identification probability associated with the second set of quasi-identifiers ($p(aux_2)$).

Additionally, or alternatively, the data set management system may determine a differential risk score as follows. Given a user request A, the interactions of different sets of quasi-identifiers may not be known, but a threshold of the risk can be defined. The data set management system may determine an average risk $\bar{r}_n$ for each data set n included in ($D_1, D_2, \ldots, D_N$) that cannot be merged into a single data set. The data set management system may identify a data set $D_1$ having the highest average risk $\bar{r}_1$ of all the data sets needed for the request A. Assuming the worst-case scenario, where adding one additional quasi-identifier $Q_l$ from the table $D_l$ makes A to be totally unique, then:

$$r_2 = \frac{1}{N} P(aux_1) \cdot P(Q_l)$$

In the above expression, $Q_l$ is the quasi-identifier with the highest disclosure probability coming from any of the tables $\{D_2, D_3, \ldots, D_N\}$, and $P(Q_l)$ is the probability of disclosure (e.g., a re-identification probability) for that quasi-identifier.

Then $\bar{r}_1$ and $\bar{r}_2$ become comparable and a threshold for the risk can be established using only metrics for one data set and the re-identification probabilities of the quasi-identifiers:

$$\frac{\bar{r}_1}{\bar{r}_2} = \frac{Eq_1}{N \cdot P(Q_l)}$$

Thus, the data set management system may calculate a differential risk score ($\bar{r}_1/\bar{r}_2$) based on a number of equivalence classes for a first set of quasi-identifiers of the multiple sets of quasi-identifiers ($Eq_1$), a number of de-identified data sets included in the multiple de-identified data sets (N), and a highest re-identification probability determined for a quasi-identifier, included in the multiple sets of quasi-identifiers, as compared to other quasi-identifiers included in the multiple sets of quasi-identifiers ($P(Q_l)$).

In some implementations, the data set management system may determine whether the differential risk score satisfies a threshold (e.g., which may be input by an administrator or determined by the data set management system, as described above in connection with FIG. 1A). In some implementations, the threshold may be one, indicating that the average risk for the first data set is higher than the average risk for the second data set. If the differential risk score satisfies the threshold (e.g., is greater than or equal to the threshold), then the data set management system may set the re-identification risk score (represented as $r_{max}$ below) equal to the average risk for the first data set:

$$\text{If } \frac{\bar{r}_1}{\bar{r}_2} > 1 \rightarrow \bar{r}_1 > \bar{r}_2 \rightarrow r_{max} = \bar{r}_1$$

For example, the data set management system may calculate, based on determining that the differential risk score satisfies the threshold, the re-identification risk score based on the number of equivalence classes for the first set of quasi-identifiers, the number of de-identified data sets included in the multiple de-identified data sets, and a re-identification probability corresponding to the first set of quasi-identifiers, as follows:

$$r_1 = \frac{Eq_1}{N} \cdot p(aux_1)$$

If the differential risk score does not satisfy the threshold (e.g., is less than or equal to the threshold), then the data set management system may calculate the re-identification risk score (represented as robs below) as follows:

$$\text{If } \frac{\bar{r}_1}{\bar{r}_2} < 1 \rightarrow \bar{r}_1 < \bar{r}_2 \rightarrow r_{min} = \bar{r}_1 \rightarrow r_{abs} = \max \begin{cases} P(Q_{l1}) \cdot P(Q_{l2}) \\ \frac{Eq_{l1}}{N} \cdot P(Q_{l1}) \end{cases}$$

For example, the data set management system may calculate, based on determining that the differential risk score does not satisfy the threshold, the re-identification risk score based on a maximum value selected from a set that includes a first value ($P(Q_{l1}) \cdot P(Q_{l2})$) and a second value ( $$\frac{Eq_{l1}}{N}.$$

$P(Q_{l1})$). The first value may be equal to a product of a first re-identification probability of a first quasi-identifier having a highest re-identification probability in the first set of quasi-identifiers ($P(Q_{l1})$) and a second re-identification probability of a second quasi-identifier having a highest re-identification probability in a second set of quasi-identifiers included in the multiple sets of quasi-identifiers ($P(Q_{l2})$). The second value may be equal to a product of the first re-identification probability ($P(Q_{l1})$) and a ratio between the number of equivalence classes for the first set of quasi-identifiers and the number of de-identified data sets $$\frac{Eq_{l1}}{N}$$

In some implementations, the data set management system may account for a cost function when calculating the risk score. The cost function may represent a cost to an attacker (e.g., in terms of time spent) to perform re-identification (e.g., to discover quasi-identifiers in external data sources). The data set management system may determine the cost function in probability form ($P_c$ in the below equation), and may modify a calculated risk score (e.g., a re-identification risk score and/or a differential risk score) to determine a final re-identification risk score. For example, the data set management system may determine a final re-identification risk score ($r_{final}$) by multiplying a risk score (represented below as a differential risk score $r_{max}$, but which could be a different differential risk score or a re-identification risk score) by the cost function ($P_c$).

$$r_{final} = r_{max} \cdot P_c$$

In some implementations, the data set management system may represent the cost function as a Poisson distribution. The probability of a Poisson event to occur, when number of events is one, can be represented as:

$$P_{Poisson} = e^{-\lambda t}$$

In the above expression, $\lambda$ is equal to a condition tail expectation (CTE), and may be input to the data set management system and/or determined based on historical records, referring the number of events in a certain time t. Because increasing the number of quasi-identifiers in a request will increase the time of re-identification cost, and the distribution event is set by the original probability of each quasi-identifier, this equation can be transformed into:

$$P_c = e^{-pN}$$

In the above expression, p represents the median of the re-identification probabilities of the quasi-identifiers, and N represents the total number of quasi-identifiers.

Thus, the data set management system may calculate the final re-identification risk score as follows:

$$\frac{\overline{r_1}}{\overline{r_2}} = \frac{Eq_1}{N \cdot P(Q_l)} e^{-\overline{p_1} N_1 + (\overline{p_2}(N_1 + 1))}$$

In the above expression, $\overline{r_1}$ is the re-identification risk (e.g., an average risk) for a first set of quasi-identifiers, $\overline{r_2}$ is the re-identification risk of adding a second set of quasi-identifiers, $\overline{p_1}$ is the median of the re-identification probabilities of the first set of quasi-identifiers, $\overline{p_2}$ is the median of the re-identification probabilities of the second set of quasi-identifiers, $N_1$ the number of quasi-identifiers in the first set of quasi-identifiers, and $Eq_1$ is the number of equivalence classes of the first set of quasi-identifiers.

As further shown in FIG. 1C, after calculating the re-identification risk score, the data set management system may selectively output, to the user device, the requested data based on a determination of whether the re-identification risk score satisfies a condition, as described above in connection with FIG. 1A. In some implementations, the data set management system may output an anonymity metric with the data, such as a k-anonymity metric, an l-diversity metric, and/or the like.

Figure 1D:
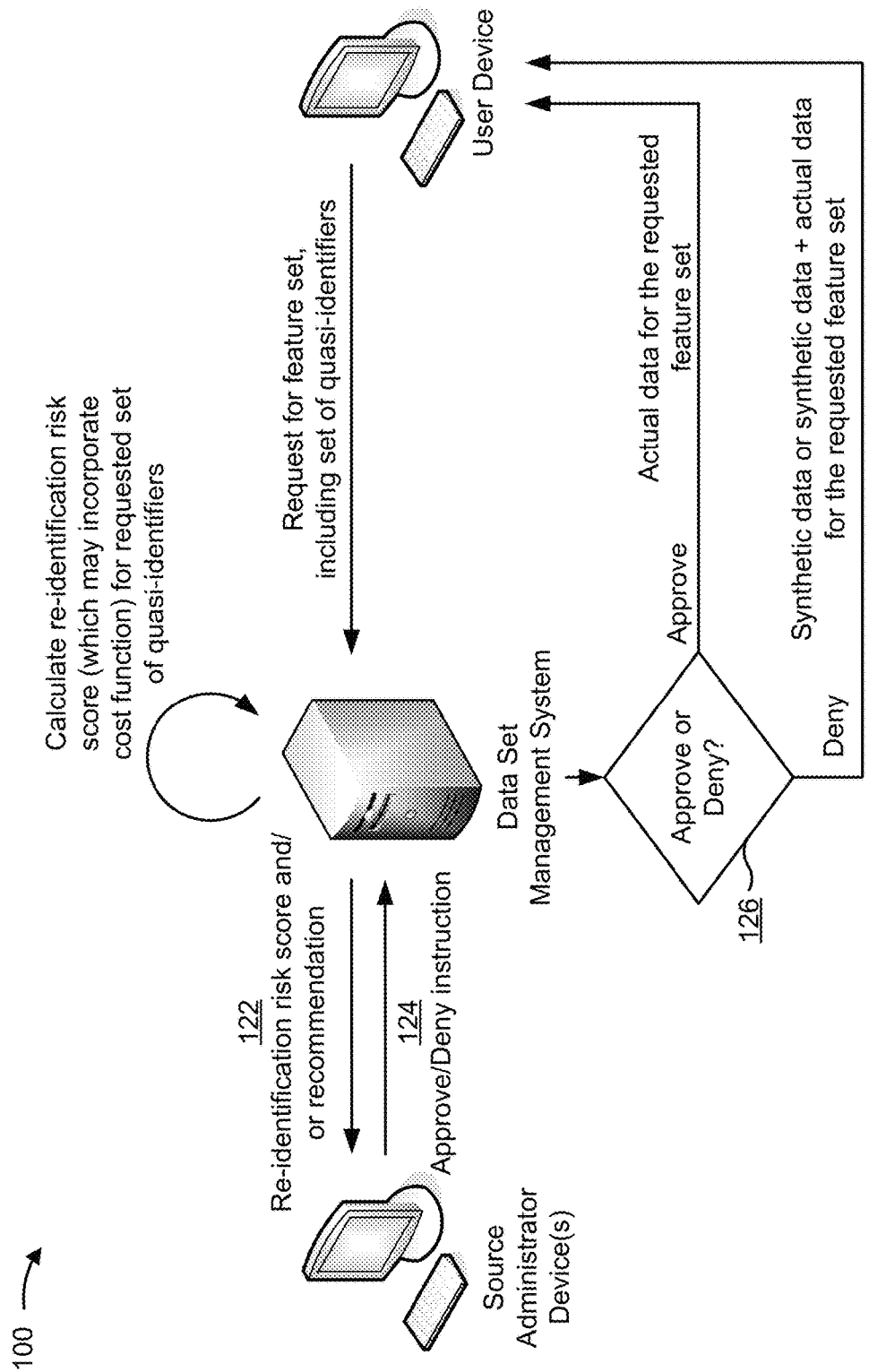

As shown in FIG. 1D, rather than automatically determining whether to output actual data or synthetic data (or a combination of actual data and synthetic data) to the user device, the data set management system may receive input from an administrator, via a source administrator device, that indicates whether to output actual data, synthetic data, or a combination thereof.

For example, as shown by reference number 122, upon receiving a request for a feature set and calculating a re-identification risk score, the data set management system may provide, to a source administrator device, the re-identification risk score. Additionally, or alternatively, the data set management system may provide a recommendation based on the re-identification risk score. The recommendation may include outputting actual data, outputting synthetic data, or outputting a combination of actual and synthetic data. In some implementations, the recommendation may indicate which quasi-identifiers are recommended to be output as synthetic data and/or which quasi-identifiers are recommended to be output as actual data, which may be determined as described above in connection with FIG. 1A.

In some implementations, the data set management system may identify a source administrator device associated with a data set from which the quasi-identifiers are requested. In some implementations, the data set management system may identify multiple source administrator devices if the feature set request is associated with multiple data sets. In some implementations, the data set management system may re-calculate the re-identification risk score based on an instruction from a first source administrator device (e.g., based on generating synthetic data as a result of the instruction), and may provide the recalculated re-identification risk score and/or an updated recommendation to a second source administrator device.

As shown by reference number 124, the data set management system may receive an instruction, from the source administrator device, that indicates whether to approve or deny the request and/or whether to approve or deny the recommendation. For example, the re-identification risk score and/or the recommendation may be output by the source administrator device (e.g., on a display, via audio, and/or the like), and an administrator may interact with the source administrator device to input the instruction, which may be transmitted to the data set management system.

As shown by reference number 126, the data set management system may output actual data, synthetic data, or a combination of actual data and synthetic data based on the instruction, as described elsewhere herein.

In some implementations, the data set management system may store one or more preferences, thresholds, and/or conditions provided as input from a source administrator device in association with a data set, and may use that information when determining an action to be performed (e.g., output actual data, synthetic data, or a combination thereof) for subsequent requests. Additionally, or alternatively, the data set management system may train a machine learning model based on received instructions, and may apply the machine learning model when determining subsequent actions and/or providing subsequent recommendations.

Figure 2:
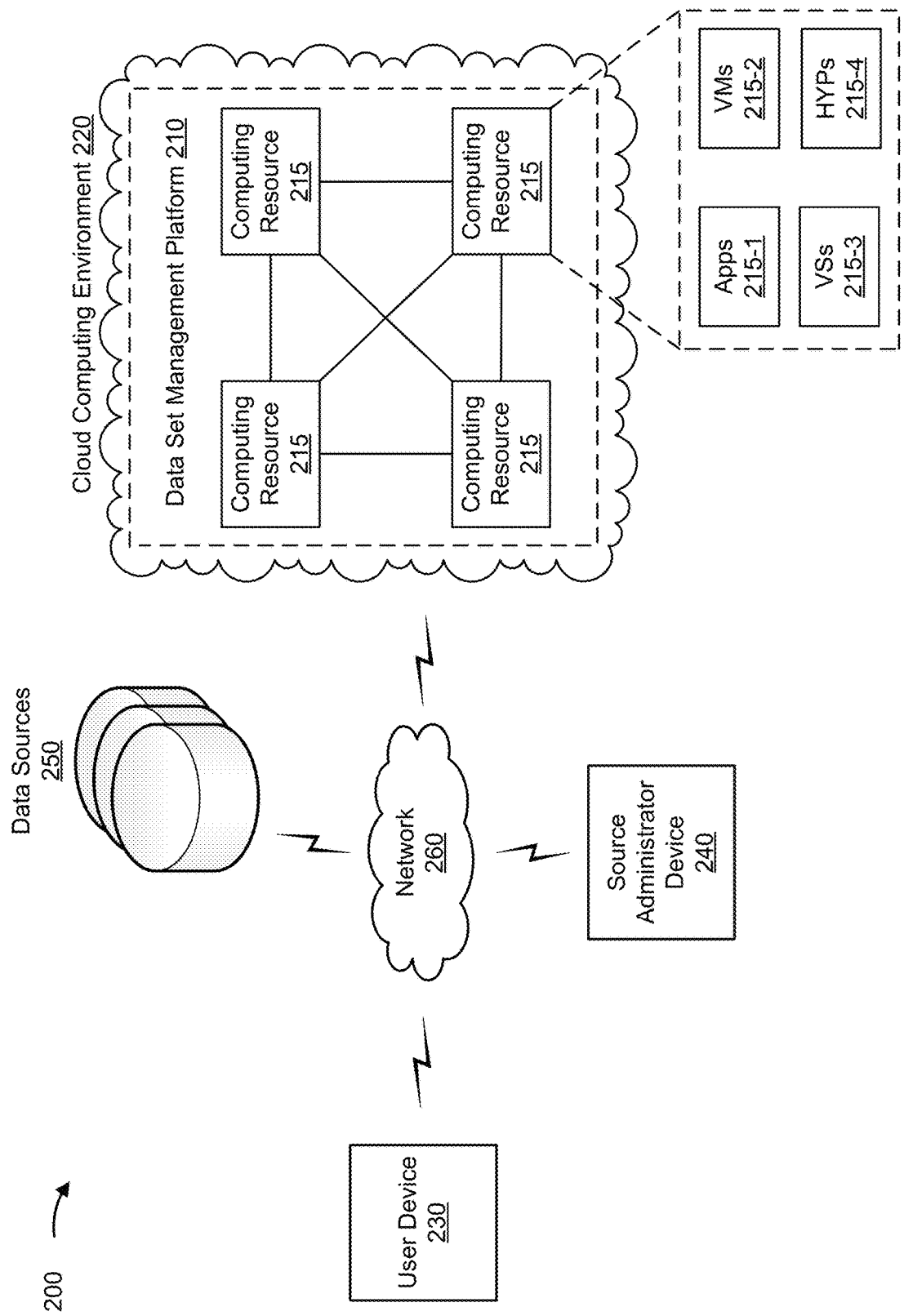
FIG. 2 is a diagram of an example environment in which systems and/or methods described herein may be implemented.

As indicated above, FIGS. 1A-1D are provided as examples. Other examples may differ from what is described with regard to FIGS. 1A-1D FIG. 2 is a diagram of an example environment 200 in which systems and/or methods described herein may be implemented. As shown in FIG. 2, environment 200 may include a data set management platform 210 implemented in a cloud computing environment 220, a user device 230, a source administrator device 240, a set of data sources 250, and a network 260. Devices of environment 200 may interconnect via wired connections, wireless connections, or a combination of wired and wireless connections.

Data set management platform 210 includes one or more devices capable of sending, receiving, generating, storing, processing, and/or providing information associated with managing data sets. For example, data set management platform 210 may be a platform implemented by cloud computing environment 220 that may send, and/or receive information regarding access to data sets. In some implementations, data set management platform 210 is implemented by computing resources 215 of cloud computing environment 220.

While the example environment 200 indicates that data set management platform 210 is implemented in a cloud computing environment 220, in some implementations, data set management platform 210 may be implemented by one or more devices outside of a cloud computing environment, such as a server device, a data center device, and/or the like. In some implementations, data set management platform 210 may be implemented using at least one cloud-based device and at least one non-cloud-based device.

Cloud computing environment 220 includes an environment that delivers computing as a service, whereby shared resources, services, and/or the like may be provided to data set management platform 210 for granting or denying access to data sets. Cloud computing environment 220 may provide computation, software, data access, storage, and/or other services that do not require end-user knowledge of a physical location and configuration of a system and/or a device that delivers the services. As shown, cloud computing environment 220 may include data set management platform 210 and computing resources 215.

Computing resource 215 includes one or more personal computers, workstation computers, server devices, or another type of computation and/or communication device. In some implementations, computing resource 215 may host data set management platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like. In some implementations, computing resource 215 may include a virtual machine or a container.

Application 215-1 includes one or more software applications that may be provided to or accessed by data set management platform 210. Application 215-1 may eliminate a need to install and execute the software applications on data set management platform 210, and/or the like. For example, application 215-1 may include software associated with data set management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 230, source administrator device 240, and/or the like), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

User device 230 includes one or more devices capable of communicating with data set management platform 210. For example, user device 230 may include a computing device, a wireless communication device, a radiotelephone, a smart phone, a wearable device (e.g., smart glasses or a smart watch), a desktop computer, a laptop computer, a tablet computer, a personal gaming system, a machine-type communication device (e.g., an Internet of Things device, a machine-to-machine device, etc.), a server, and/or a similar device.

Source administrator device 240 includes one or more devices capable of communicating with data set management platform 210. For example, source administrator device 240 may include a computing device, a wireless communication device, a radiotelephone, a smart phone, a wearable device (e.g., smart glasses or a smart watch), a desktop computer, a laptop computer, a tablet computer, a personal gaming system, a machine-type communication device (e.g., an Internet of Things device, a machine-to-machine device, etc.), a server, and/or a similar device.

Data source 250 includes one or more devices capable of storing a data set and providing the data set to data set management platform 210. For example, data source 250 may include a computer, a server, a cloud computing environment, a memory or storage resource, and/or the like.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
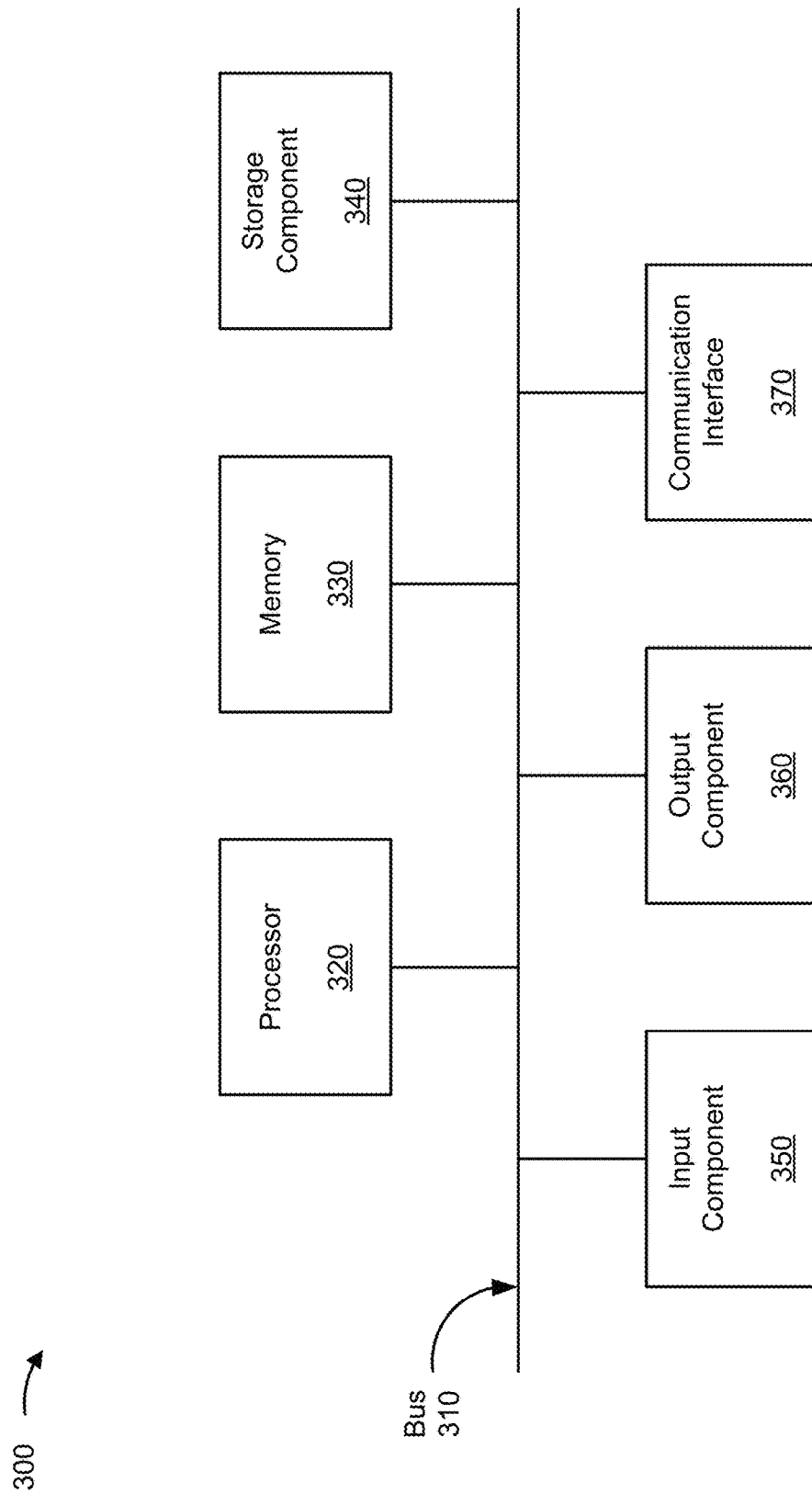
FIG. 3 is a diagram of example components of one or more devices of FIG. 2.

FIG. 3 is a diagram of example components of a device 300. Device 300 may correspond to data set management platform 210, computing resource 215, user device 230, source administrator device 240, data source 250, and/or the like. In some implementations, data set management platform 210, computing resource 215, user device 230, source administrator device 240, and/or data source 250 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
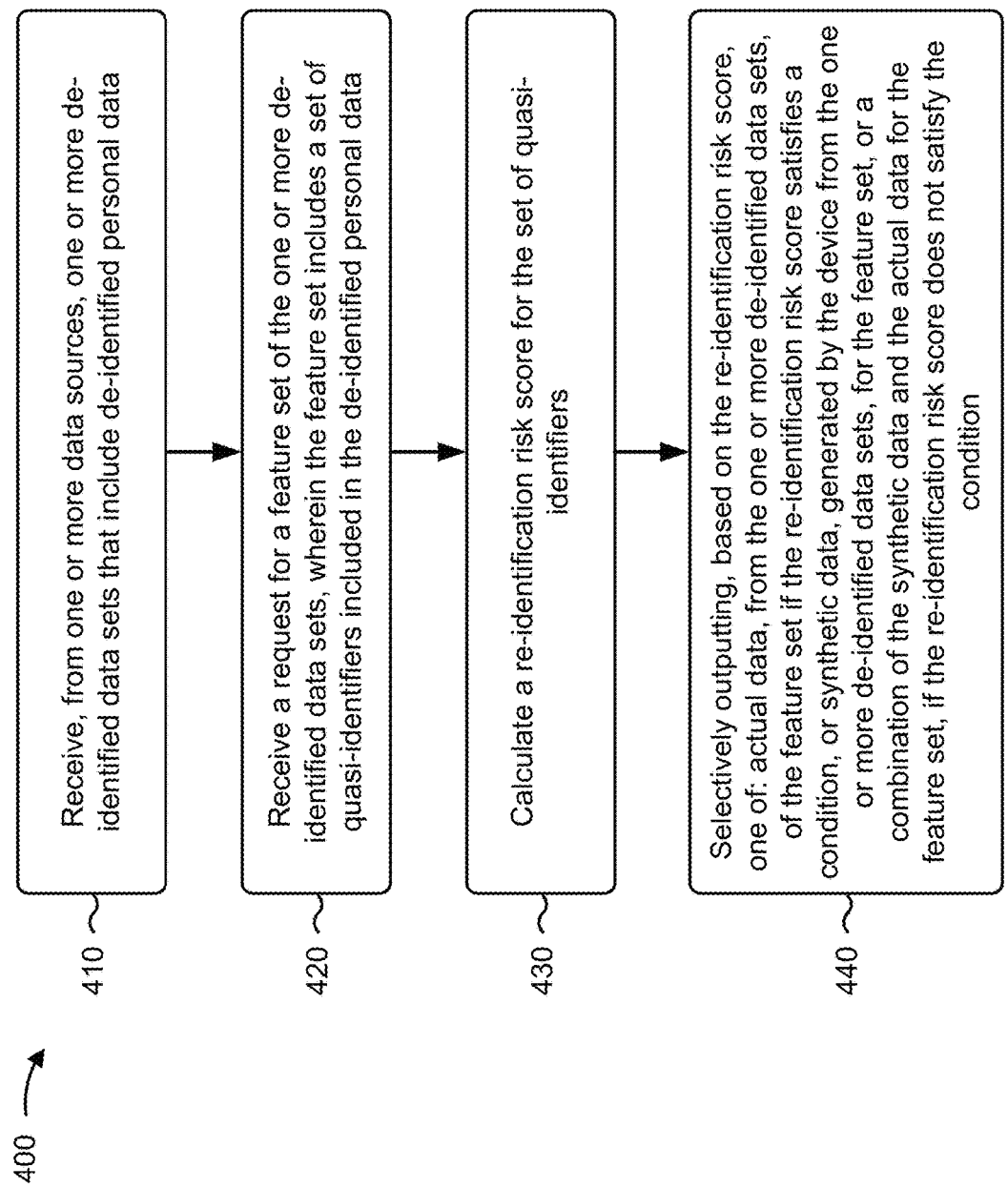
FIG. 4 is a flow chart of an example process for controlling access to de-identified data sets based on a risk of re-identification.

FIG. 4 is a flow chart of an example process 400 for controlling access to de-identified data sets based on a risk of re-identification. In some implementations, one or more process blocks of FIG. 4 may be performed by a device, a system, or a platform, such as a data set management platform (e.g., data set management platform 210). In some implementations, one or more process blocks of FIG. 4 may be performed by another device or a group of devices separate from or including the data set management platform, such as a user device (e.g., user device 230), a source administrator device (e.g., source administrator device 240), and/or the like.

As shown in FIG. 4, process 400 may include receiving, from one or more data sources, one or more de-identified data sets that include de-identified personal data (block 410). For example, the data set management platform (e.g., using computing resource 215, processor 320, memory 330, storage component 340, input component 350, communication interface 370, and/or the like) may receive, from one or more data sources, one or more de-identified data sets that include de-identified personal data, as described above.

As further shown in FIG. 4, process 400 may include receiving a request for a feature set of the one or more de-identified data sets, wherein the feature set includes a set of quasi-identifiers included in the de-identified personal data (block 420). For example, the data set management platform (e.g., using computing resource 215, processor 320, memory 330, storage component 340, input component 350, communication interface 370, and/or the like) may receive a request for a feature set of the one or more de-identified data sets, as described above. In some implementations, the feature set includes a set of quasi-identifiers included in the de-identified personal data.

As further shown in FIG. 4, process 400 may include calculating a re-identification risk score for the set of quasi-identifiers (block 430). For example, the data set management platform (e.g., using computing resource 215, processor 320, memory 330, storage component 340, and/or the like) may calculate a re-identification risk score for the set of quasi-identifiers, as described above.

As further shown in FIG. 4, process 400 may include selectively outputting, based on the re-identification risk score, one of: actual data, from the one or more de-identified data sets, of the feature set if the re-identification risk score satisfies a condition, or synthetic data, generated by the device from the one or more de-identified data sets, for the feature set, or a combination of the synthetic data and the actual data for the feature set, if the re-identification risk score does not satisfy the condition (block 440). For example, the data set management platform (e.g., using computing resource 215, processor 320, memory 330, storage component 340, output component 360, communication interface 370, and/or the like) may selectively output, based on the re-identification risk score, one of: actual data, from the one or more de-identified data sets, of the feature set if the re-identification risk score satisfies a condition, or synthetic data, generated by the device from the one or more de-identified data sets, for the feature set, or a combination of the synthetic data and the actual data for the feature set, if the re-identification risk score does not satisfy the condition.

Process 400 may include additional implementations, such as any single implementation or any combination of implementations described below and/or in connection with one or more other processes described elsewhere herein.

In a first implementation, the re-identification risk score for the set of quasi-identifiers is calculated based on: a size of an equivalence class for the set of quasi-identifiers, and a set of re-identification probabilities corresponding to the set of quasi-identifiers.

In a second implementation, alone or in combination with the first implementation, the re-identification risk score for the set of quasi-identifiers is calculated based on: a number of records, in the one or more de-identified data sets, that belong to an equivalence class having a size of one, and a total number of records included in the one or more de-identified data sets.

In a third implementation, alone or in combination with one or more of the first and second implementations, the re-identification risk score for the set of quasi-identifiers is calculated based on a size of an equivalence class for the set of quasi-identifiers.

In a fourth implementation, alone or in combination with one or more of the first through third implementations, process 400 includes determining that the re-identification risk score does not satisfy the condition; identifying a first subset of quasi-identifiers of the set of quasi-identifiers; generating the synthetic data for the first subset of quasi-identifiers based on determining that the re-identification risk score does not satisfy the condition; recalculating the re-identification risk score for the set of quasi-identifiers based on the synthetic data generated for the first subset of quasi-identifiers and actual data for a second subset of quasi-identifiers of the set of quasi-identifiers; determining that the recalculated re-identification risk score satisfies the condition; and outputting the synthetic data generated for the first subset of quasi-identifiers and the actual data for the second subset of quasi-identifiers based on determining that the recalculated re-identification risk score satisfies the condition.

In a fifth implementation, alone or in combination with one or more of the first through fourth implementations, the first subset of quasi-identifiers is identified based on a determination that the first subset of quasi-identifiers has a greater contribution to the re-identification risk score not satisfying the condition as compared to the second subset of quasi-identifiers.

In a sixth implementation, alone or in combination with one or more of the first through fifth implementations, the one or more de-identified data sets includes: a single data set, or multiple data sets that are merged prior to calculating the re-identification risk score.

In a seventh implementation, alone or in combination with one or more of the first through sixth implementations, the synthetic data is generated based on a machine learning model trained to identify both binary quasi-identifiers and count quasi-identifiers included in the set of quasi-identifiers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
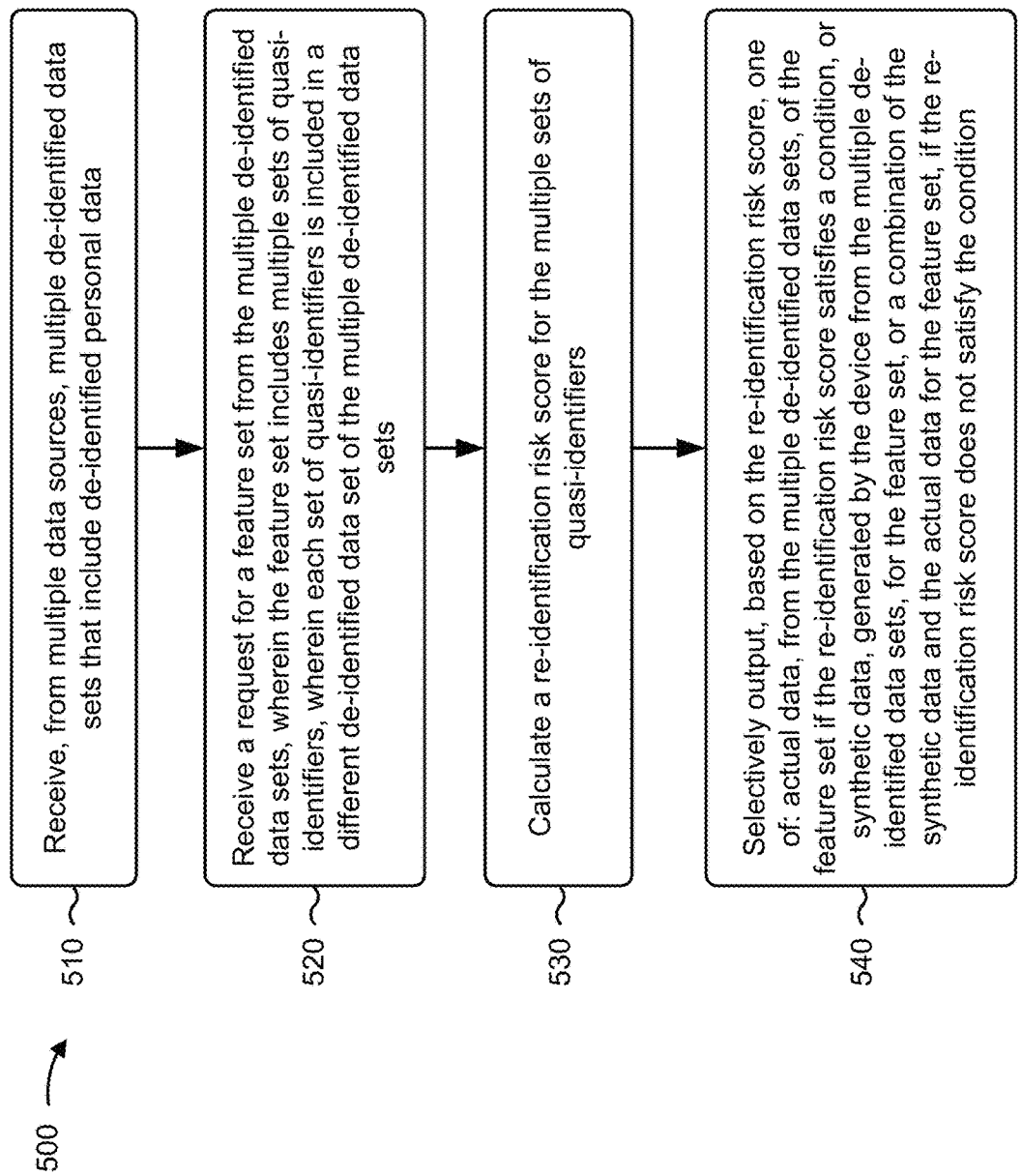
FIG. 5 is a flow chart of another example process for controlling access to de-identified data sets based on a risk of re-identification.

FIG. 5 is a flow chart of an example process 500 for controlling access to de-identified data sets based on a risk of re-identification. In some implementations, one or more process blocks of FIG. 5 may be performed by a device, a system, or a platform, such as a data set management platform (e.g., data set management platform 210). In some implementations, one or more process blocks of FIG. 5 may be performed by another device or a group of devices separate from or including the data set management platform, such as a user device (e.g., user device 230), a source administrator device (e.g., source administrator device 240), and/or the like.

As shown in FIG. 5, process 500 may include receiving, from multiple data sources, multiple de-identified data sets that include de-identified personal data (block 510). For example, the data set management platform (e.g., using computing resource 215, processor 320, memory 330, storage component 340, input component 350, communication interface 370, and/or the like) may receive, from multiple data sources, multiple de-identified data sets that include de-identified personal data, as described above.

As further shown in FIG. 5, process 500 may include receiving a request for a feature set from the multiple de-identified data sets, wherein the feature set includes multiple sets of quasi-identifiers, wherein each set of quasi-identifiers is included in a different de-identified data set of the multiple de-identified data sets (block 520). For example, the data set management platform (e.g., using computing resource 215, processor 320, memory 330, storage component 340, input component 350, communication interface 370 and/or the like) may receive a request for a feature set from the multiple de-identified data sets, as described above. In some implementations, the feature set includes multiple sets of quasi-identifiers. In some implementations, each set of quasi-identifiers is included in a different de-identified data set of the multiple de-identified data sets.

As further shown in FIG. 5, process 500 may include calculating a re-identification risk score for the multiple sets of quasi-identifiers (block 530). For example, the data set management platform (e.g., using computing resource 215, processor 320, memory 330, storage component 340, and/or the like) may calculate a re-identification risk score for the multiple sets of quasi-identifiers, as described above.

As further shown in FIG. 5, process 500 may include selectively outputting, based on the re-identification risk score, one of: actual data, from the multiple de-identified data sets, of the feature set if the re-identification risk score satisfies a condition, or synthetic data, generated by the device from the multiple de-identified data sets, for the feature set, or a combination of the synthetic data and the actual data for the feature set, if the re-identification risk score does not satisfy the condition (block 540). For example, the data set management platform (e.g., using computing resource 215, processor 320, memory 330, storage component 340, output component 360, communication interface 370, and/or the like) may selectively output, based on the re-identification risk score, one of: actual data, from the multiple de-identified data sets, of the feature set if the re-identification risk score satisfies a condition, or synthetic data, generated by the device from the multiple de-identified data sets, for the feature set, or a combination of the synthetic data and the actual data for the feature set, if the re-identification risk score does not satisfy the condition.

Process 500 may include additional implementations, such as any single implementation or any combination of implementations described below and/or in connection with one or more other processes described elsewhere herein.

In a first implementation, the re-identification risk score is determined based on a differential risk score that is calculated based on: a number of equivalence classes for a first set of quasi-identifiers of the multiple sets of quasi-identifiers, a number of de-identified data sets included in the multiple de-identified data sets, and a highest re-identification probability determined for a quasi-identifier, included in the multiple sets of quasi-identifiers, as compared to other quasi-identifiers included in the multiple sets of quasi-identifiers.

In a second implementation, alone or in combination with the first implementation, process 500 includes determining that the differential risk score satisfies a threshold; and calculating, based on determining that the differential risk score satisfies the threshold, the re-identification risk score based on: the number of equivalence classes for the first is setting of quasi-identifiers, the number of de-identified data is setting included in the multiple de-identified data sets, and a re-identification probability is corresponding to the first set of quasi-identifiers.

In a third implementation, alone or in combination with one or more of the first and second implementations, process 500 includes determining that the differential risk score does not satisfy a threshold; and calculating, based on determining that the differential risk score does not satisfy the threshold, the re-identification risk score based on: a maximum value is selecting from a set that includes a first value and a second value, wherein the first value is being equal to a product of a first re-identification probability of a first quasi-identifier having a highest re-identification probability in the first set of quasi-identifiers and a second re-identification probability of a second quasi-identifier having a highest re-identification probability in a second set of quasi-identifiers included in the multiple sets of quasi-identifiers, and wherein the second value is being equal to a product of the first re-identification probability and a ratio between the number of equivalence classes for the first set of quasi-identifiers and the number of de-identified data sets.

In a fourth implementation, alone or in combination with one or more of the first through third implementations, the differential risk score is further calculated based on: a median of re-identification probabilities associated with the first set of quasi-identifiers, a median of re-identification probabilities associated with a second set of quasi-identifiers included in the multiple sets of quasi-identifiers, and a number of quasi-identifiers included in the first set of quasi-identifiers.

In a fifth implementation, alone or in combination with one or more of the first through fourth implementations, process 500 includes identifying, using a genetic algorithm, a subset of quasi-identifiers, of the multiple sets of quasi-identifiers, that have a higher contribution to the re-identification risk score not satisfying the condition as compared to another subset of quasi-identifiers included in the multiple sets of quasi-identifiers; and calculating the re-identification risk score using the subset of quasi-identifiers.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from one or more data sources, one or more de-identified data sets that include de-identified personal data;
receiving, by the device, a request for a feature set of the one or more de-identified data sets, wherein the feature set includes a set of information included in the de-identified personal data,
wherein each piece of information, of the set of information, comprises data that does not include personally identifiable information, and
wherein the personally identifiable information can be created based on combining data of two or more pieces of information, of the set of information;
determining, by the device, a quantity of equivalence classes for a first group of information, of the set of information;
determining, by the device, a quantity of de-identified data sets included in the one or more de-identified data sets;
determining, by the device, a highest re-identification probability determined for a piece of information, included in the set of information, as compared to other pieces of information included in the set of information;
determining, by the device, a differential risk score based on the quantity of equivalence classes, the quantity of de-identified data sets, and the highest re-identification probability;
determining, by the device, that the differential risk score does not satisfy a threshold;
determining, by the device, an amount of computational resources available for determining a re-identification risk score for the set of information;
selecting, by the device and based on the amount of computational resources available for determining the re-identification risk score for the set of information, a technique to be used to calculate the re-identification risk score;
determining, by the device and based on the differential risk score not satisfying the threshold and in accordance with the selected technique, the re-identification risk score based on:
a maximum value selected from a set that includes a first value and a second value,
wherein the first value is equal to a product of a first re-identification probability of a first information having a highest re-identification probability in a first group of information and a second re-identification probability of a second information having a highest re-identification probability in a second group of information included in the set of information; and
utilizing, by the device, a generative adversarial network algorithm with an autoencoder architecture to generate high-dimensional discrete samples for synthetic data,
wherein the high-dimensional discrete samples for the synthetic data are generated from the one or more de-identified data sets, and
wherein minibatch averaging is utilized to avoid mode collapse; and
selectively outputting, by the device and based on the re-identification risk score, one of:
actual data, from the one or more de-identified data sets, of the feature set if the re-identification risk score satisfies a condition, or
the synthetic data, for the feature set, if the re-identification risk score does not satisfy the condition.

2. The method of claim 1, wherein the re-identification risk score for the set of information is calculated based on:
a size of an equivalence class for the set of information, and
a set of re-identification probabilities corresponding to the set of information.

3. The method of claim 1, wherein the re-identification risk score for the set of information is calculated based on:
a quantity of records, in the one or more de-identified data sets, that belong to an equivalence class having a size of one, and
a total quantity of records included in the one or more de-identified data sets.

4. The method of claim 1, wherein the re-identification risk score for the information is calculated based on a size of an equivalence class for the set of information.

5. The method of claim 1, further comprising:
determining that the re-identification risk score does not satisfy the condition;
identifying a first subset of information of the set of information;
generating the synthetic data for the first subset of information based on determining that the re-identification risk score does not satisfy the condition;

recalculating the re-identification risk score for the set of information based on the synthetic data generated for the first subset of information and actual data for a second subset of information of the set of information;
determining that the recalculated re-identification risk score satisfies the condition; and
outputting the synthetic data generated for the first subset of information and the actual data for the second subset of information based on determining that the recalculated re-identification risk score satisfies the condition.

6. The method of claim 5, wherein the first subset of information is identified based on a determination that the first subset of information has a greater contribution to the re-identification risk score not satisfying the condition as compared to the second subset of information.

7. The method of claim 1, wherein the one or more de-identified data sets includes multiple data sets that are merged prior to determining the re-identification risk score.

8. The method of claim 1, wherein the synthetic data is generated based on a machine learning model trained to identify both binary information and count information included in the set of information.

9. A device, comprising:
one or more memories; and
one or more processors, communicatively coupled to the one or more memories, to:
  receive, from multiple data sources, multiple de-identified data sets that include de-identified personal data;
  receive a request for a feature set from the multiple de-identified data sets,
    wherein the feature set includes multiple sets of information,
    wherein each set of information is included in a different de-identified data set of the multiple de-identified data sets,
    wherein each piece of information, of the multiple sets of information, comprises data that does not include personally-identifiable information, and
    wherein the personally-identifiable information can be created based on combining data of two or more pieces of information, of the multiple sets of information;
  determine a quantity of equivalence classes for a first set of information, of the multiple sets of information;
  determine a quantity of de-identified data sets included in the multiple deidentified data sets;
  determine a highest re-identification probability determined for a piece of information, included in the multiple sets of information, as compared to other pieces of information included in the multiple sets of information;
  determine a differential risk score based on the quantity of equivalence classes, the quantity of de-identified data sets, and the highest re-identification probability;
  determine that the differential risk score does not satisfy a threshold;
  determine an amount of computational resources available for determining a reidentification risk score for the multiple sets of information;
  select, based on the amount of computational resources available for determining the re-identification risk score for the multiple sets of information, a technique to be used to calculate the re-identification risk score;
  determine, based on the differential risk score not satisfying the threshold and in accordance with the selected technique, the re-identification risk score for the multiple sets of information based on:
    a maximum value selected from a set that includes a first value and a second value,
    wherein the first value is equal to a product of a first re-identification probability of a first piece of information having a highest re-identification probability in the first set of information and a second reidentification probability of a second piece of information having a highest re-identification probability in a second set of information included in the multiple sets of information;
  utilize a generative adversarial network algorithm with an autoencoder architecture to generate high-dimensional discrete samples for synthetic data,
    wherein the high-dimensional discrete samples for the synthetic data are generated from the multiple de-identified data sets, and
    wherein minibatch averaging is utilized to avoid mode collapse; and selectively output, based on the re-identification risk score, one of:
      actual data, from the multiple de-identified data sets, of the feature set if the re-identification risk score satisfies a condition, or
      the synthetic data, for the feature set, if the re-identification risk score does not satisfy the condition.

10. The device of claim 9, wherein the one or more processors are further to:
  determine that the differential risk score satisfies a threshold; and
  calculate, based on determining that the differential risk score satisfies the threshold, the re-identification risk score based on:
  the quantity of equivalence classes for the first set of information,
  the quantity of de-identified data sets included in the multiple de-identified data sets, and
  a re-identification probability corresponding to the first set of information.

11. The device of claim 9, wherein the differential risk score is further calculated based on:
  a median of re-identification probabilities associated with the first set of information,
  a median of re-identification probabilities associated with the second set of information, and
  a quantity of pieces of information included in the first set of information.

12. The device of claim 9, wherein the one or more processors, when determining the re-identification risk score, are further to:
  identify a subset of information, of the multiple sets of information, that have a higher contribution to the re-identification risk score not satisfying the condition as compared to another subset of information included in the multiple sets of information; and
  calculate the re-identification risk score using the subset of information.

13. The device of claim 9, wherein the one or more processors are further to:
  merge, prior to determining the re-identification risk score, the multiple de-identified data sets to form a single de-identified data set.

14. The device of claim 9, wherein the synthetic data is generated based on a machine learning model trained to identify both binary information and count information included in the multiple sets of information.

15. A non-transitory computer-readable medium storing a set of instructions, the set of instructions comprising:
one or more instructions that, when executed by one or more processors of a device, cause the device to:
receive, from one or more data sources, one or more de-identified data sets that include de-identified personal data;
receive a request for a feature set of the one or more de-identified data sets,
wherein the feature set includes a set of information included in the deidentified personal data,
wherein each piece of information, of the set of information, comprises data that does not include personally-identifiable information, and
wherein the personally-identifiable information can be created based on combining data of two or more pieces of information, of the set of information;
determine a quantity of equivalence classes for a first group of information, of the set of information;
determine a quantity of de-identified data sets included in the one or more deidentified data sets;
determine a highest re-identification probability determined for a piece of information, included in the set of information, as compared to other pieces of information included in the set of information;
determine a differential risk score based on the quantity of equivalence classes, the quantity of de-identified data sets, and the highest re-identification probability;
determine that the differential risk score does not satisfy a threshold;
determine an amount of computational resources available for determining a reidentification risk score for the set of information,
select, based on the amount of computational resources available for determining the re-identification risk score for the set of information, a technique to be used to calculate the re-identification risk score;
determine, based on the differential risk score not satisfying the threshold and in accordance with the selected technique, the re-identification risk score based on:
a maximum value selected from a set that includes a first value and a second value,
wherein the first value is equal to a product of a first reidentification probability of a first piece of information having a highest re-identification probability in the first group of information and a second re-identification probability of a second piece of information having a highest re-identification probability in a second group of information included in the set of information;
utilize a generative adversarial network algorithm with an autoencoder architecture to generate high-dimensional discrete samples for synthetic data,
wherein the high-dimensional discrete samples for the synthetic data are generated from the one or more de-identified data sets, and
wherein minibatch averaging is utilized to avoid mode collapse; and
selectively output, based on the re-identification risk score, one of:
actual data, from the one or more de-identified data sets, of the feature set if the re-identification risk score satisfies a condition, or
the synthetic data, for the feature set, if the re-identification risk score does not satisfy the condition.

16. The non-transitory computer-readable medium of claim 15, wherein the re-identification risk score for the set of information is calculated based on:
a size of an equivalence class for the set of information, and
a set of re-identification probabilities corresponding to the set of information.

17. The non-transitory computer-readable medium of claim 15, wherein the re-identification risk score for the set of information is calculated based on:
a quantity of records, in the one or more de-identified data sets, that belong to an equivalence class having a size of one, and
a total quantity of records included in the one or more de-identified data sets.

18. The non-transitory computer-readable medium of claim 15,
wherein the re-identification risk score for the set of information is calculated based on a size of an equivalence class for the set of information.

19. The non-transitory computer-readable medium of claim 15,
wherein the one or more instructions further cause the device to:
determine that the re-identification risk score does not satisfy the condition;
identify a first subset of information of the set of information;
generate the synthetic data for the first subset of information based on determining that the re-identification risk score does not satisfy the condition;
recalculate the re-identification risk score for the set of information based on the synthetic data generated for the first subset of information and actual data for a second subset of information of the set of information;
determine that the recalculated re-identification risk score satisfies the condition; and
output the synthetic data generated for the first subset of information and the actual data for the second subset of information based on determining that the recalculated re-identification risk score satisfies the condition.

20. The non-transitory computer-readable medium of claim 19, wherein the first subset of information is identified based on a determination that the first subset of information has a greater contribution to the re-identification risk score not satisfying the condition as compared to the second subset of information.

* * * * *